US009769656B2

(12) United States Patent
Bertin

(10) Patent No.: US 9,769,656 B2
(45) Date of Patent: Sep. 19, 2017

(54) ELECTRONIC DEVICE AND COMMUNICATION METHOD

(75) Inventor: Marc Bertin, La Celle les Bordes (FR)

(73) Assignee: Oberthur Technologies, Levallois (FR)

( * ) Notice: Subject to any disclaimer, the term of this patent is extended or adjusted under 35 U.S.C. 154(b) by 0 days.

(21) Appl. No.: 13/330,934

(22) Filed: Dec. 20, 2011

(65) Prior Publication Data

US 2012/0158847 A1 Jun. 21, 2012

(30) Foreign Application Priority Data

Dec. 21, 2010 (FR) ...................... 10 60928

(51) Int. Cl.
*G06F 15/16* (2006.01)
*H04W 12/06* (2009.01)
*H04L 29/06* (2006.01)
*H04L 9/32* (2006.01)

(52) U.S. Cl.
CPC ......... *H04W 12/06* (2013.01); *H04L 63/0492* (2013.01); *H04L 63/0853* (2013.01); *H04L 63/0861* (2013.01); *H04L 9/32* (2013.01)

(58) Field of Classification Search
USPC ....................................................... 709/204
See application file for complete search history.

(56) References Cited

U.S. PATENT DOCUMENTS

| | | | | |
|---|---|---|---|---|
| 7,779,073 B2 * | 8/2010 | Hoile | ..................... | G06Q 30/02 709/203 |
| 7,809,801 B1 * | 10/2010 | Wang | ..................... | G06F 15/16 709/217 |
| 8,117,314 B2 * | 2/2012 | Croft | ..................... | G06F 3/1415 709/217 |
| 2002/0000470 A1 * | 1/2002 | Lanzaro | ................ | G06F 1/1626 235/462.45 |
| 2002/0067259 A1 * | 6/2002 | Fufidio | .............. | G07C 9/00031 340/541 |
| 2003/0006280 A1 | 1/2003 | Seita et al. | | |
| 2003/0233458 A1 * | 12/2003 | Kwon | ..................... | H04L 29/06 709/227 |
| 2004/0014423 A1 * | 1/2004 | Croome | .................. | H04L 63/08 455/41.2 |
| 2004/0064730 A1 * | 4/2004 | Kamiyama | ............. | H04L 29/06 726/29 |
| 2005/0216553 A1 * | 9/2005 | Mallonee | ............... | G06Q 10/08 709/203 |
| 2005/0239447 A1 * | 10/2005 | Holzman | ................ | H04L 63/08 455/414.3 |
| 2006/0111053 A1 * | 5/2006 | Wu | ..................... | G06K 17/0022 455/90.3 |
| 2006/0219776 A1 | 10/2006 | Finn | | |

(Continued)

FOREIGN PATENT DOCUMENTS

EP     1 675 076 A1     6/2006

*Primary Examiner* — Viet Vu
*Assistant Examiner* — James Edwards
(74) *Attorney, Agent, or Firm* — Arent Fox LLP

(57) ABSTRACT

An electronic device including a communication module capable of exchanging messages with an external entity, characterized in that the communication module includes at least a first communication circuit capable of exchanging messages using a first communication protocol and a second communication circuit capable of exchanging messages using a second communication protocol different from the first communication protocol.

15 Claims, 3 Drawing Sheets

(56) References Cited

U.S. PATENT DOCUMENTS

| | | | |
|---|---|---|---|
| 2007/0140163 A1* | 6/2007 | Meier | H04W 8/005 |
| | | | 370/329 |
| 2007/0180449 A1* | 8/2007 | Croft | G06F 3/1415 |
| | | | 718/1 |
| 2008/0222711 A1 | 9/2008 | Michaelis | |
| 2009/0043907 A1* | 2/2009 | Peterson | G06F 3/0236 |
| | | | 709/231 |
| 2009/0178118 A1* | 7/2009 | Cedo Perpinya | H04L 63/08 |
| | | | 726/3 |
| 2009/0282251 A1* | 11/2009 | Cook | H04L 63/062 |
| | | | 713/171 |
| 2009/0286511 A1* | 11/2009 | Petit | G07B 15/00 |
| | | | 455/411 |
| 2010/0142502 A1* | 6/2010 | Shiraki | H04W 12/06 |
| | | | 370/338 |
| 2011/0009092 A1* | 1/2011 | Etchegoyen | H04L 63/0428 |
| | | | 455/411 |
| 2011/0070833 A1* | 3/2011 | Perkins | G06F 19/327 |
| | | | 455/41.1 |
| 2011/0086615 A1* | 4/2011 | Golder | G06F 21/88 |
| | | | 455/411 |
| 2012/0029917 A1* | 2/2012 | Chang | H04L 12/588 |
| | | | 704/235 |
| 2012/0324584 A1* | 12/2012 | Al-Shaykh | G06F 17/30905 |
| | | | 726/26 |
| 2013/0244616 A1* | 9/2013 | Ding | H04W 12/06 |
| | | | 455/411 |

* cited by examiner

ELECTRONIC DEVICE AND COMMUNICATION METHOD

BACKGROUND OF THE INVENTION

The present invention relates to the field of portable electronic devices, particularly those allowing storage of personal data and communication with other electronic devices.

There exist many portable devices offering various functionalities to their users: mobile telephone, multimedia player, electronic chip integrated into an access or payment card, . . . .

Each functionality that a portable electronic device can offer involves certain constraints.

For example, during the use of a contactless access or payment card type electronic device, it is desired that the access or the payment be validated by the user by positioning his card in close proximity to a card reader. To satisfy this constraint, the card is therefore equipped with a short-range communication circuit (of the NFC or Near Field Communication type).

Contrarily, in the particular case of a multimedia player, it is desired to be able to read or write multimedia data from an external device, for example a personal computer, even if the multimedia player is relatively far away. To satisfy this constraint, the multimedia player is therefore equipped with a medium-range communication circuit, with greater range than the short-range communication circuit mentioned earlier.

Thus, a portable electronic device is generally designed based on the constraints of a single functionality (for example, access card or multimedia player) or a limited number of constraints (for example, a mobile telephone also allowing data storage and including a multimedia player).

SUMMARY OF THE INVENTION

The present invention has the object of mitigating these drawbacks by proposing a solution that allows a portable device to offer many varied functionalities to its user.

To this end, the invention relates to an electronic device including a communication module capable of exchanging messages with an external entity. The communication module includes at least a first communication circuit capable of exchanging messages using a first communication protocol, and a second communication circuit capable of exchanging messages using a second communication protocol different from the first communication protocol.

Correlatively, the invention proposes a communication method implemented by an electronic device including a communication module capable of exchanging messages with an external entity, characterized in that this communication module includes at least a first communication circuit capable of exchanging messages using a first communication protocol and a second communication circuit capable of exchanging messages using a second communication protocol different from the first communication protocol, the communication method including an exchange of messages with an external entity using the first or the second communication circuit.

Thus, the invention allows one and the same electronic device to implement, on the one hand, functionalities involving constraints verified by the first communication module and other functionalities involving constraints verified by the second communication module. For example, the first communication module is a short-range module and the second communication module is a medium-range module.

According to a first aspect, the electronic device includes:
an acquisition module for authentication data input by a user,
a processing unit capable of determining a user authentication indicator based on said authentication data, and
a module for executing a secure action configured to execute said secure action only if said user authentication indicator has a predetermined value.

Correlatively, the communication method can include:
a step consisting of acquisition of the authentication data input by a user,
a step consisting of determining a user authentication indicator based on said authentication data, and
a step consisting of executing a secure action if said user authentication indicator has a predetermined value.

Thanks to these characteristics, the user of the electronic device can control the execution of the secure action. Indeed, the secure action is executed only if the user has input correct authentication data. A third party or external entity is thus prevented from commanding the execution of the secure action without the user's consent.

The secure action can include communication, through said communication module, with an external entity.

This communication can include the sending of data stored in a memory accessible to the electronic device to a host station capable of displaying said data.

In this case, the external entity cannot obtain the data from the electronic device without the user's consent.

The electronic device can include display means capable of displaying the number of host stations detected by the communication module.

This communication can also include the sending of a cryptographic message to a host station.

The cryptographic message can be used in particular to authenticate the electronic device.

The invention also relates to a system including an electronic device conforming to the invention and a host station, wherein the host station includes:
a module for receiving the cryptographic message,
a module for evaluating an authentication indicator of the electronic device based on the cryptographic message, and
a module for executing a second secure action configured to execute said second secure action only if said electronic device authentication indicator has a predetermined value.

In this case, the host station performs a secure action when the electronic device is authenticated, the authentication of the device requiring prior authentication of the user. This dual authentication allows increased security.

According to one sample implementation, the secure action includes commanding the opening of a doorway having a closed state and an open state.

Thus, the electronic device can serve as an access card.

The invention also relates to a system including a first electronic device conforming to the invention and a second electronic device, wherein the secure action of the first electronic device includes the sending of an authentication message to the second electronic device, the second electronic device including a module for executing a secure action configured to execute said secure action in response to the reception of said authentication message.

Correlatively, an electronic device conforming to the invention can include:
a module for transmitting an authentication query message,
a module for receiving an authentication message, a module for executing a secure action configured to execute said secure action in response to the reception of said authentication message.

In this case, the user of the first electronic device can control the execution of a secure action by a second electronic device.

The electronic device can include a mass memory with a capacity equal to or greater than 100 MB.

According to one embodiment, the electronic device includes:

a module for detecting a host station (200) using the first communication module (120), and a module for sending data to the detected host station (200) using the second communication module (120).

In other words, the first communication module can be used for pairing the electronic device with a host station, subsequent communication between the electronic device and the host station using the second electronic module. As already discussed, this makes it possible to adapt to different constraints. For example, if the first communication module is of the short-range type and the second communication module is of the medium-range type, the user can explicitly trigger the pairing by positioning the electronic device near the host station. He must not, however, keep the electronic device near the host station during subsequent communication.

The electronic device can be independent of a telephone network. In other words, in this embodiment, the electronic device is not a mobile telephone.

In one particular embodiment, the different steps in the communication method are determined by computer program instructions.

Consequently, the invention also pertains to a computer program on an information medium, this program being subject to being implemented in a computer or equivalent, this program comprising instructions designed to implement the steps of a communication method such as those described above.

This program can use any programming language and can be in the form of source code, object code or an intermediate code between source code and object code, such as in partially compiled form, or in any other form desired.

The invention also pertains to a computer-readable information medium containing the instructions of a computer program as mentioned above.

The information medium can be any entity or device capable of storing the program. For example, the medium can consist of a storage means such as a ROM, for example a CD-ROM or an electronic microcircuit ROM, or even a magnetic recording medium, for example a diskette (floppy disk) or a hard disk.

Further, the information medium can be a transmissible medium such as an electrical or optical signal, which can be routed via an electrical or optical cable, by radio or by other means. The program according to the invention can in particular be downloaded over an Internet type network.

Alternatively, the information medium can be an integrated circuit wherein the program is incorporated, the circuit being designed to execute or to be used in the execution of the method in question (an ASIC circuit for example).

BRIEF DESCRIPTION OF DRAWINGS

The features and advantages of the present invention will appear more clearly from the following description, given by way of indication and without limitation, with reference to the appended drawings in which.

DETAILED DESCRIPTION OF THE EMBODIMENTS OF THE INVENTION

Figure 1:
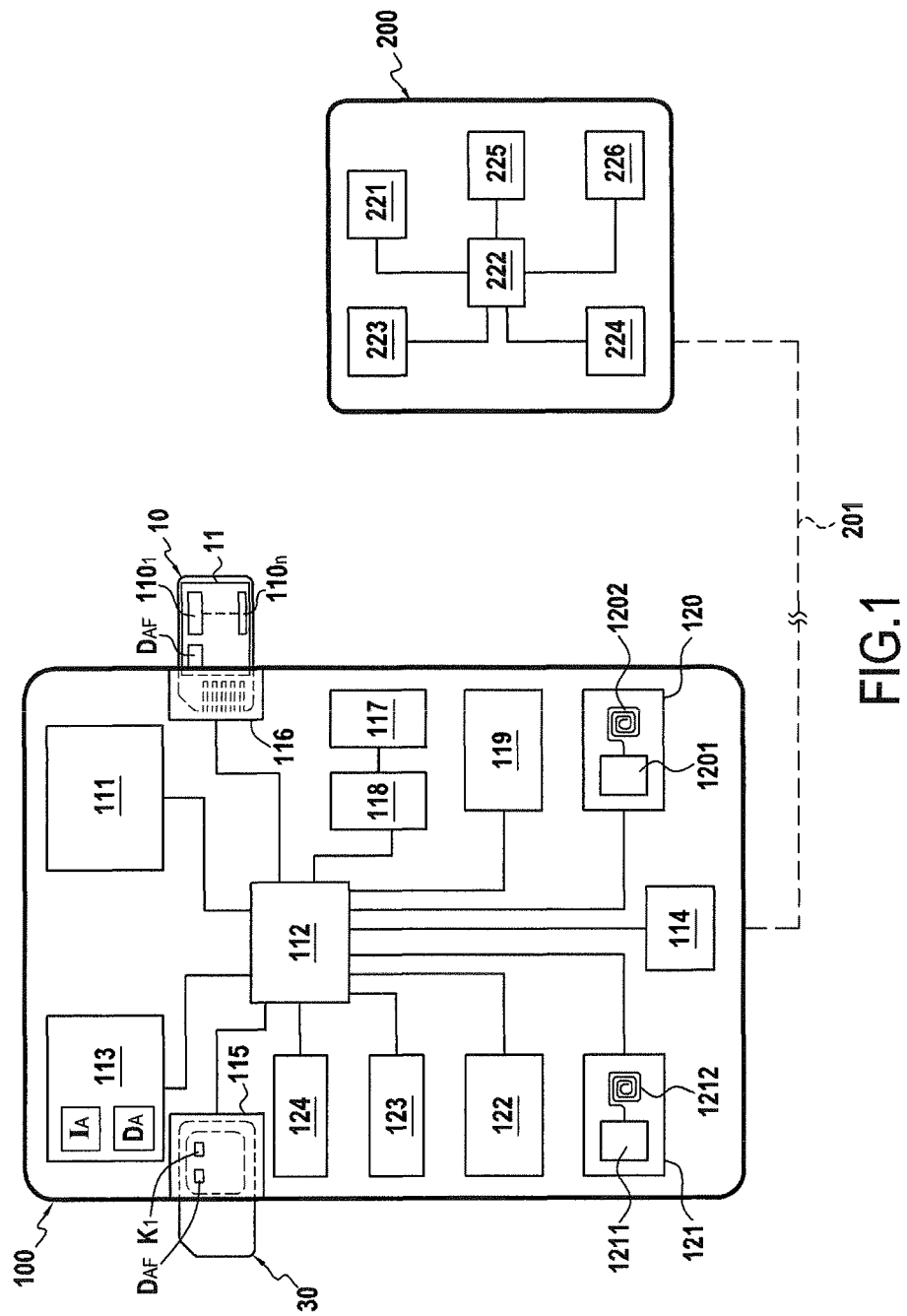
FIG. 1 is a schematic view illustrating an architecture or system in which the invention is implemented in conformity with one embodiment.

FIG. 1 illustrates an architecture or system wherein the invention can be implemented. This system comprises an electronic device 100 and a host station 200. The electronic device 100 has an integral mass memory 10, and a chip card 30, both removable.

As described hereafter in detail, the removable mass memory 10, which can be a microSD card as illustrated in FIG. 1, is connected to the electronic device 100. Further, the electronic device 100 can communicate with the host station 200 through a link 201. As described later in greater detail, the link 201 can be a short-range wireless link, a medium-range wireless link or a wired link. According to one variation in implementation, the electronic device can be directly connected to the host station 200 by means of a suitable connector, the link 201 consisting in this case of the connector.

What is meant here by "mass memory" is a high-capacity nonvolatile memory which can be read and/or written by a host device such as a computer. What is meant here by "high capacity" is a nonvolatile rewritable storage capacity of at least 100 MB, which is greater for example than the storage capacity of a chip card or SIM card type microcircuit card. The mass memory 10 is embodied preferably in the form of a card of the type comprising a plastic body supporting an electronic integrated circuit which includes in particular a large-capacity memory component as defined before, the card also including flush electrical contacts allowing the electronic circuit of said card to be connected to an external device such as the electronic device 100. The mass memory 10 can also be a USB flash drive or any other mass memory satisfying the definition given before. The mass memory includes a memory space 11 organized for example into a plurality of addressable blocks $110_1$ through $110_N$.

The electronic device 100 is embodied preferably in the form of a standalone portable device. As shown in FIG. 1, the electronic device 100 has the overall hardware architecture of a computer and includes in particular the following elements:

a nonvolatile memory 111,
a processing unit or a microprocessor 112,
a volatile memory 113,
a wired communication interface 114,
a microcircuit card 30 connector 115,
a microSD card connector 116,
a USB flash drive connector 117 associated with a USB controller 118,
an authentication data input interface 119,
a short-range wireless communication circuit 120,
a medium-range wireless communication circuit 121,
a command keypad 122,
light emitting diodes 123,
a standalone power supply 124.

The host station 200 has the hardware architecture of a computer. Thus the host station 200 includes a nonvolatile memory 221, a microprocessor 222, a volatile memory 223, a communication interface 224, a display screen 225 and a keyboard 226. The microprocessor 222 allows execution of the computer program stored in the nonvolatile memory 221, using the volatile memory 223. The interface 224 allows communication, through the link 201, with the electronic device 100. The host station 200 can occur in different forms which be detailed later.

The interface 224 can be a wired communication interface and the link 201 can be a wired connection. In this case, the wired communication interface 114 allows the electronic device 100 to exchange data and instructions with the host 200 through a wired link, using a communication protocol suited to the wired link.

The link 201 between the electronic device 100 and the host station 200, can also, however, be a wireless link. In this case, the interface 224 is a wireless communication circuit allowing communication over a radio frequency link using short-range 120 or medium-range 121 wireless communication circuits.

Thus, whatever the type of interface 224, the electronic device 100 can communicate with the host station 200 using a link 201 of the appropriate type. Each type of link 201, however, allows specific constraints to be satisfied. The electronic device 100 therefore allows varied functionalities to be offered to its user, involving varied constraints in terms of the type of link 201.

The short-range wireless communication circuit 120, which can for example be a near-field communication module NFC or a body area network wherein the signals pass through the body of a user, includes an electronic circuit 1201 and an antenna 1202 consisting of a series of coils. It uses a predetermined communication protocol.

Likewise, the medium-range communication circuit 121, of the Wi-Fi, Zigbee or Bluetooth type for example, includes an electronic circuit 1211 and an antenna 1212. It uses another predetermined communication protocol.

The authentication data input interface 119 can correspond to any component or circuit capable of capturing authentication data, such as, in particular, a sensor of biometric data such as for example a fingerprint, retinal pattern or voiceprint, or a keypad allowing input of a code. In the example described here, the authentication data input interface 119 is a fingerprint scanner.

The microcircuit card 30 corresponds in particular to a chip card in the ID_000 format, such as for example a SIM card or "smart card" containing processing means (microcontroller) and storage means (not shown in FIG. 1).

One or more reference authentication data $D_{AF}$ are recorded in the microcircuit card 30 and/or in the mass memory 10. This or these reference authentication data are used during authentication of the user.

The system shown in FIG. 1 can also be used in different applications. Certain of these applications can necessitate authentication of the user of the electronic device 100 to carry out a predetermined action. Hereafter, the term "secure action" is used for an action which requires authentication of the user before being executed by the electronic device 100.

Figure 2:
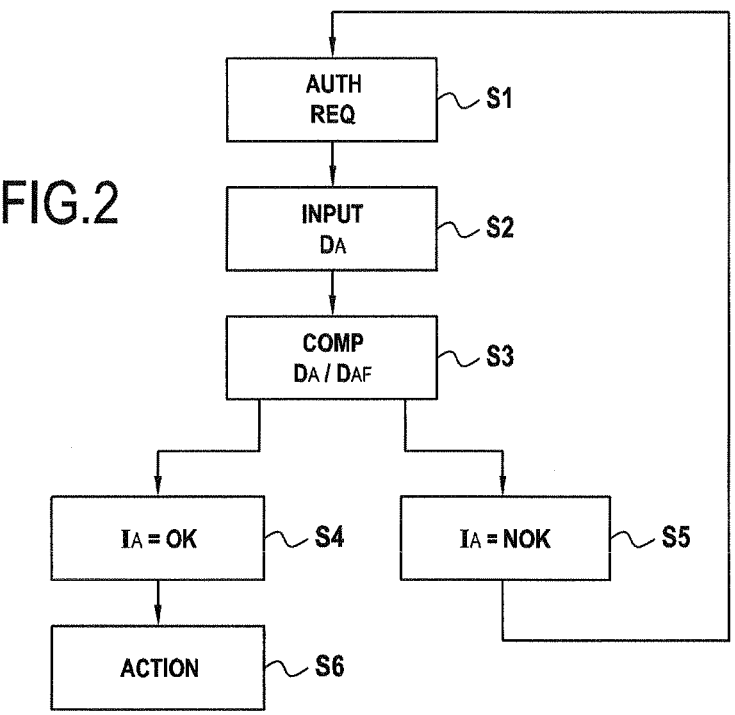
FIG. 2 is a flowchart showing the steps carried out during authentication of a user of an electronic device conforming to the invention.

The principal steps of a method allowing authentication of the user of the electronic device 100 is now described in relation with FIG. 2.

At the start, for example when switching on the electronic device 100 or upon detection of a host station 200, the electronic device 100 asks the user to authenticate himself, for example by causing one or more light-emitting diodes provided in the device 100 to blink (step S1). The user enters authentication data $D_A$ by means of the authentication data input interface 119 (step S2). In the example described here, the user enters his fingerprint in the interface 119. The input authentication data $D_A$, here his fingerprint, is temporarily stored in the volatile memory 113 and compared by the microprocessor 112 to the reference authentication data $D_{AF}$ stored in the microcircuit card 30 or in the mass memory 10 (step S3). If the input authentication data $D_A$ matches reference authentication data, the microprocessor 112 assigns the value "OK" to a user authentication indicator $I_A$ stored in the volatile memory 113 (step S4). If the contrary holds true, the microprocessor 112 assigns to the authentication indicator $I_A$ the value "NOK", which is the default value prior to any new authentication (step S5). The electronic device 100 can then again ask the user to identify himself by again causing one or more of the light-emitting diodes 123 to blink.

As a variation, the authentication indicator $I_A$ can be stored in the microcircuit card 30. Also as a variation, in step S2, the authentication data $D_A$ are input by means of the keypad 122.

When the authentication is successful ($I_A$=OK), the electronic device executes a secure action (step S6). Several examples of secure actions are given hereafter.

Thanks to the method of FIG. 2, the user can control the execution of the secure action. Indeed, the secure action of step S6 is executed only if the user has input correct authentication data. Thus a third party or a host station is prevented from commanding the execution of the secure action without the user's consent.

Figure 3:
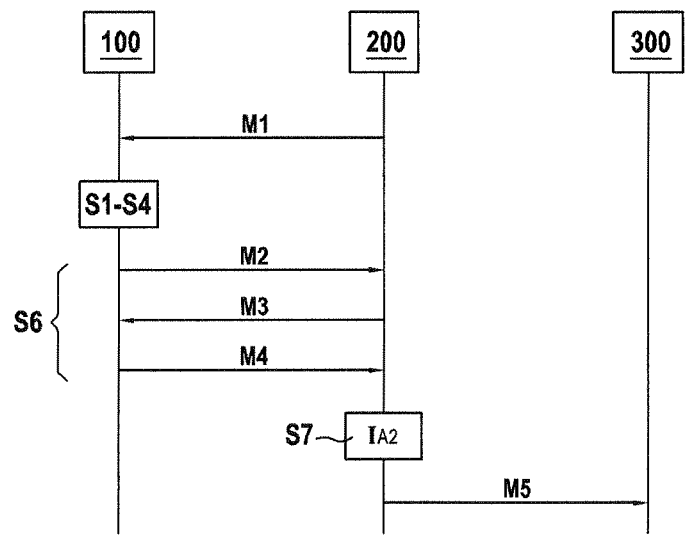
FIGS. 3 through 6 are flow diagrams showing the applications of an electronic device conforming to the invention.

FIG. 3 shows a first application of the electronic device 100. In this application, the electronic device 100 provides access control. Indeed, the host station 200 can command the opening of a doorway 300 having a closed state and an open state.

The doorway 300 can for example comprise a locking door, and the host station 200 commands the opening and the closing of the lock. As a variation, the doorway includes a door, a portal, a barrier or any other element the position whereof can be controlled by the host station 200 between a closed position and an open position.

The host station 200 is located near the doorway 300 and regularly broadcasts a heartbeat message M1.

Thus, when the electronic device 100 receives the message M1, for example through the communication circuit 121, it deduces therefrom that the doorway 300 is nearby. The electronic device 100 then implements the steps of the authentication process previously described with reference to FIG. 2.

In this example, the secure action of step S6 of FIG. 2 includes communication with the host station 200, for the purpose of authenticating the electronic device 100 with respect to the host station 200.

The authentication of the electronic device 100 with respect to the host station 200 uses for example a secret symmetric key system. In this case, the electronic device 100 sends to the host station a message M2 that includes an identifier for the electronic device 100. The identifier of the electronic device 100 is for example stored in the microcircuit card 30. In response to the reception of the message M2, the host station 200 sends a message M3 to the electronic device 100 containing a random number called the Challenge. Depending on the Challenge received in the message M3 and on a key K1 stored in the microcircuit card 30, the electronic device calculates a response R. The calculation of the response R can be carried out by a cryptographic processor built into the microcircuit card 30 or by the processing unit 112. Finally, the electronic device 100 sends a message M4 to the host station 200 containing the response R.

In a symmetric cryptographic system, the host station 200 also knows the key K1 associated with the identifier in message M1. Thus, the host station 200 can calculate a response R' and compare it with the response R in the message M4.

In the event of a match between R and R', that is in the event of authentication of the electronic device 100 with respect to the host station 200, the host station 200 assigns to an authentication indicator $I_{A2}$ of the electronic device 100 the value OK (step S7), then sends a message M5 to the doorway 300 to command it to open.

It will be observed that in the application of FIG. 3, the host station carries out a secure action once the electronic device 100 is authenticated (step S7), the authentication of the electronic device 100 necessitating prior authentication of the user (step S4). This dual authentication allows increased security.

In the example described, the secure action of the host station is the command opening the doorway 300. However, other actions can be performed as a variation. For example, the host station 200 can be a personal computer and the aforementioned dual authentication makes it possible to authorize access to the host station 200 or to a remote server accessible through the host station.

Figure 4:
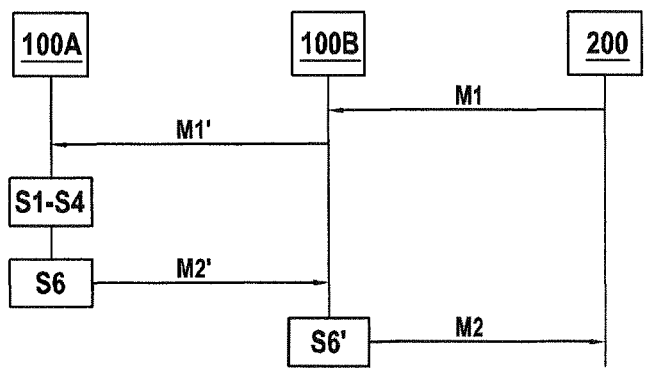

FIG. 4 shows a second application which makes use of two electronic devices 100. To facilitate the description, the electronic devices 100 of FIG. 4 are designed by the reference symbols 100A and 100B. In this application, the electronic devices 100A and 100B intercommunicate and a secure action is executed by the electronic device 100B only in the event of the authentication of the user of the electronic device 100A.

The host station 200 regularly broadcasts a heartbeat message M1. Thus, when the electronic device 100B receives the message M1, for example via the communication circuit 121, it deduces therefrom that the host station 200 is located nearby. The electronic device 100B then sends an authentication request message M1' to the electronic device 100A, for example through the communication circuit 121.

In response to the reception of the message M1', the electronic device 100A implements the steps of the authentication method described previously with reference to FIG. 2.

In this example, the secure action of step S6 of FIG. 2 includes the sending of the message M2' from the electronic device 100A to the electronic device 100B.

In response to the reception of the message M2', the electronic device 100B performs, in step S6', a secure action. The secure action of step S6' can for example include the authentication of the electronic device 100B with respect to the host station 200, as previously described with reference to FIG. 3. This case is illustrated by the message M2 in FIG. 4.

It is observed that, in the application of FIG. 4, the electronic device 100B performs a secure action once the user of the electronic device 100A is authenticated. Thus the user of an electronic device 100A can control the execution of a secure action by the electronic device 100B.

Figure 5:
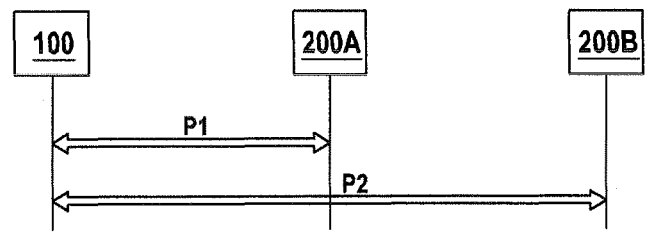

FIG. 5 shows a second application of an electronic device 100 conforming to the invention. Here, the electronic device 100 is used for access to a service, for example a public transport service. In this application, the electronic device 100 communicates with two host stations 200 in succession. To facilitate the description, the host stations 200 of FIG. 5 are designated with the reference symbols 200A and 200B.

The host station 200A is for example a personal computer, which can communicate with the electronic device 100 through a medium-range wireless link 201 during a phase P1.

The phase P1 can include in particular authentication of the user of the electronic device 100, authentication of the electronic device 100 with respect to the host station 200A, the execution of an Internet browser by the host station 200A to gain access to a remote server the address whereof is stored in the electronic device 100, reading or writing of data in the mass memory 10 by the remote server, by way of the browser . . . . Thus, using the browser of the host station 200A, a user can obtain from a distant server an access token for a service (for example an electronic transportation ticket) and store it in the mass memory 10.

The host station 200B is an access token reader connected to a device controlling access to the service, for example an access portal to a subway station. The host station 200B can communicate with the electronic device 100 through a short-range wireless link 201 during a phase P2.

The phase P2 can include authentication of the electronic device 100 with respect to the host station 200B and transmission of data from the mass memory 10 to the host station 200B.

In this example, the electronic device 100 uses the medium-range wireless communication circuit 121, on the one hand, to communicate with the host station 200A and the short-range wireless communication circuit 120, on the other hand, to communicate with the host station 200B. The use of two different types of link makes it possible to satisfy the constraints encountered during the phases P1 and P2: To obtain an access token for the service (phase P1), it is not necessary to place the device in immediate proximity to the host station 200A, which facilitates the operations to be performed. To validate access to the service, however (phase P2), the user must place the electronic device 100 in immediate proximity to the host station 200B, which allows verification of the explicit consent of the user.

Figure 6:
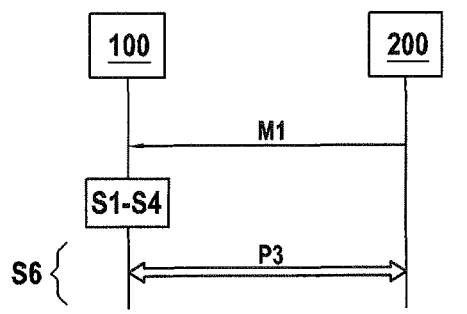

FIG. 6 shows a fourth application of an electronic device 100 conforming to the invention. Personal data of the user are stored in the mass memory 10 and the host station 200 includes a screen capable of displaying these data.

The electronic device 100 detects the host station 200, for example thanks to a message M1 broadcast by the host station 200. Then, the user authenticates himself as previously described with reference to FIG. 2.

After authentication of the user, the secure action of step S6 includes communication between the electronic device 100 and the host station 200 during a phase P3. During the phase P3, personal data stored in the mass memory 10 are transmitted to the host station 200 and displayed on the screen of the host station 200. For example, the electronic device 100 implements a Web server to which the host station 200 gains access. Communication between the electronic device 100 and the host station 200 can be encrypted, for example using a key K1 stored in the microcircuit card 30. Communication between the electronic device 100 and the host station 200 can use the communication circuit 120 or 121, depending on the constraints of the application considered.

If several host stations 200 are present within the range of the communication circuit 120 or 121 considered, the personal data can be displayed by every host station. As a variation, a host station is selected during a pairing procedure preceding the phase P3, the personal data being communicated during the phase P3 only to the host station 200 selected.

The electronic device 100 can display the number of host stations 200 that it detects, for example using the diodes 123 or a numeric display, not shown. This lets the user know whether he risks sending personal data to a screen that is not in his field of vision.

The pairing procedure can for example include the mutual detection of short-range communication circuits present in the electronic device 100 and the host station 200, communication in phase P3 being performed using the medium-range communication circuits.

As a variation, the pairing can be performed in the following manner:
  The user commands (by means of the keypad 122 for example) the issuance, by the electronic device 100, of a screen recognition signal.
  The host station 200 which receives this recognition signal displays a recognition message on its screen.
  If the screen displaying a recognition message is the one that the user wishes to select, the user validates the pairing (using the keypad 122 for example).

The user can command the display of the recognition message on several screens and validate the pairing on several screens. In this case, his personal data transmitted during the phase P3 will be displayed on several screens.

One and the same electronic device 100 can advantageously be used to implement the different applications described with reference to FIGS. 3 through 6, as well as possibly other applications. Indeed, the electronic device 100 is designed to be able to adapt to varying constraints allowing the implementation of various functionalities. In particular, the electronic device 100 allows authentication of the user and/or of the electronic device 100 for several varied services. Furthermore, personal data of the user are stored in the mass memory 10. Thus, the electronic device 100 constitutes to some degree a "virtual me" of the user.

The steps described earlier, and in particular steps S1 through S6, correspond to instructions in a computer program which are preferably, but not exclusively, stored in the nonvolatile memory 111 in order to be executed by the microprocessor 112 with the aid of the volatile memory 113.

It is worth noting that the electronic device 100 is not a mobile telephone. In other words, the electronic device 100 is independent of a telephone network.

Configuration parameters of the electronic device 100 are stored in the nonvolatile memory 111 and/or in the volatile memory 113. The configuration parameters indicate for example the definition of button actions, the secure actions for which authentication is needed, . . . .

In another embodiment, when the electronic device is linked to a host station 200, for example when the electronic device 100 is connected by the USB connector 117 to a host station 200 of the personal computer type, the host station 200 executes automatically a file stored in the electronic device 100 (for example an "Autorun.inf" file). This file includes instructions allowing the aforementioned configuration parameters to be modified. For example, this file includes instructions for executing an Internet browser by the host station 200 for contacting a configuration server with a predetermined address, the configuration server being able to transmit modified configuration parameters.

The invention claimed is:

1. An electronic device, comprising:
  a communication module configured to exchange messages with a host station, wherein the communication module comprises a first communication circuit configured to exchange messages using a first communication protocol, and a second communication circuit configured to exchange messages using a second communication protocol different from the first communication protocol;
  a detection module configured to detect host stations through the messages exchanged using the first communication protocol;
  a display module configured to display a number of host stations detected by the detection module, and to permit a user of the electronic device to select one of the detected host stations;
  a sending module configured to send data extracted from a memory of the electronic device to the selected host station through messages exchanged using the second communication protocol, wherein the memory is configured to store configuration parameters of the electronic device and at least one file executable by the host station in response to detecting that the electronic device is connected to the host station, and the configuration parameters of the electronic device are configured to be modifiable by the host station in executing the at least one file;
  a user authentication module for acquiring authentication data input by the user to authenticate the user to access the electronic device; and
  upon successfully authenticating the user to access the electronic device, a device authentication module for exchanging authentication data with the selected host station to authenticate the electronic device to communicate with the selected host station.

2. The electronic device according to claim 1, further comprising:
  a processing unit configured to determine a user authentication indicator based on the authentication data, and
  a module for executing a secure action configured to execute the secure action only if the user authentication indicator shows a predetermined value.

3. The electronic device according to claim 2, wherein the secure action includes a communication, by the communication module, with an external entity.

4. The electronic device according to claim 3, wherein the device authentication module is configured to send a cryptographic message to the selected host station.

5. A system including an electronic device according to claim 4 and the selected host station, wherein the host station includes modules for:
  receiving the cryptographic message;
  evaluating an electronic device authentication indicator based on the cryptographic message; and
  executing a second secure action configured to execute the second secure action only if the electronic device authentication indicator has a predetermined value.

6. The system according to claim 5, wherein the second secure action includes commanding an opening of a doorway having a closed state and an open state.

7. A system including a first electronic device according to claim 3 and a second electronic device, wherein the secure action of the first electronic device includes sending an authentication message to the second electronic device, the second electronic device including a module for executing another secure action in response to receiving the authentication message.

8. A system comprising an electronic device according to claim 1 and the selected host station, wherein the host station is configured to display the data.

9. The electronic device according to claim 1, wherein the device authentication module is configured to:
  send an authentication query message;
  receive an authentication message; and
  execute a secure action in response to receiving the authentication message.

10. The electronic device according to claim 1, further comprising a mass memory with a capacity greater than or equal to 100 MB.

11. The electronic device according to claim 1, wherein the electronic device is independent of a telephone network.

12. The electronic device according to claim 1, wherein the detection module is configured to detect a plurality of host stations present within a communication range of both the first and second communication circuits, the first communication circuit is configured to perform a pairing procedure between the electronic device and one of the plurality of host stations, and the second communication circuit is used for transmitting data between the electronic device and the one of the plurality of host stations.

13. A communication method implemented by an electronic device, the method comprising:
  exchanging messages with host stations using a first communication circuit configured to exchange messages using a first communication protocol, and a second communication circuit configured to exchange messages using a second communication protocol, the second communication protocol being different from the first communication protocol;
  detecting the host stations through the messages exchanged using the first communication protocol;
  displaying a number of detected host stations;
  permitting a user of the electronic device to select one of the detected host stations;
  sending data extracted from a memory of the electronic device to the selected host station through messages exchanged using the second communication protocol, wherein the memory is configured to store configuration parameters of the electronic device and at least one file executable by the host station in response to detecting that the electronic device is connected to the host station, and the configuration parameters of the electronic device are configured to be modifiable by the host station in executing the at least one file;
  acquiring authentication data input by the user to authenticate the user to access the electronic device; and
  upon successfully authenticating the user to access the electronic device, exchanging authentication data with the selected host station to authenticate the electronic device to communicate with the selected host station.

14. The communication method according to claim 13, further comprising:
  determining a user authentication indicator based on the authentication data, and
  executing a secure action if the user authentication indicator has a predetermined value.

15. A computer program product comprising a non-transitory computer-readable medium having control logic stored therein for causing a computer to perform a communication method, comprising:
  code for exchanging messages with host stations using a first communication circuit configured to exchange messages using a first communication protocol, and a second communication circuit configured to exchange messages using a second communication protocol, the second communication protocol being different from the first communication protocol;
  code for detecting the host stations through the messages exchanged using the first communication protocol;
  code for displaying a number of detected host stations;
  code for permitting a user of the electronic device to select one of the detected host stations;
  code for sending data extracted from a memory of the electronic device to the selected host station through messages exchanged using the second communication protocol, wherein the memory is configured to store configuration parameters of the electronic device and at least one file executable by the host station in response to detecting that the electronic device is connected to the host station, and the configuration parameters of the electronic device are configured to be modifiable by the host station in executing the at least one file;
  code for acquiring authentication data input by the user to authenticate the user to access the electronic device; and
  upon successfully authenticating the user to access the electronic device, code for exchanging authentication data with the selected host station to authenticate the electronic device to communicate with the selected host station.

* * * * *